UNITED STATES PATENT OFFICE.

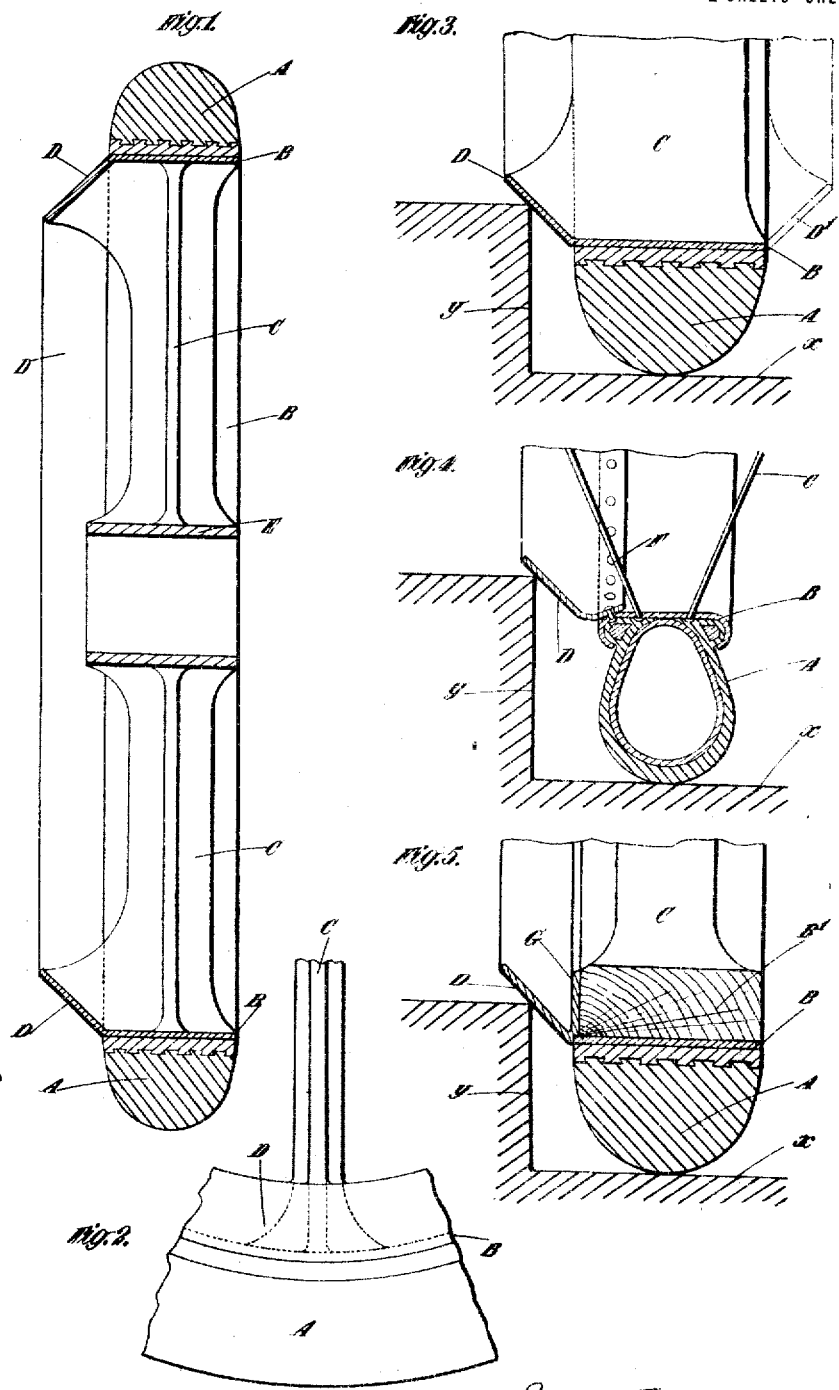

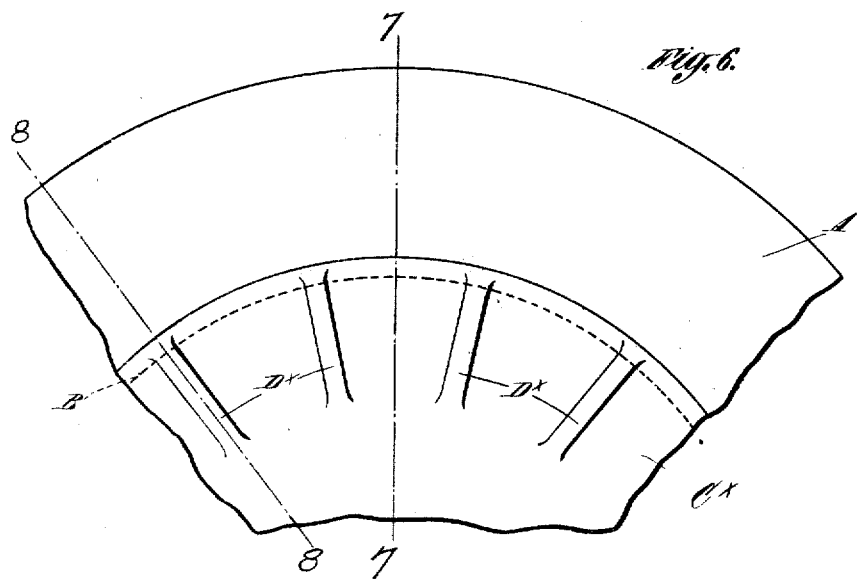
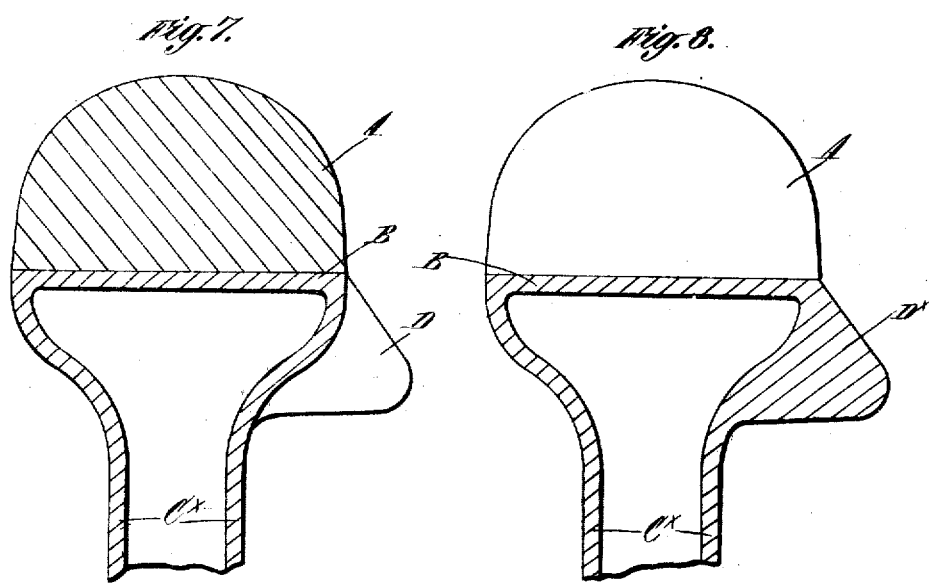

COLIN MACBETH, OF BIRMINGHAM, ENGLAND, ASSIGNOR TO THE DUNLOP RUBBER COMPANY, LIMITED, OF WESTMINSTER, ENGLAND.

WHEEL FOR ROAD-VEHICLES.

1,269,543.  Specification of Letters Patent.  Patented June 11, 1918.

Application filed September 17, 1917. Serial No. 191,837.

*To all whom it may concern:*

Be it known that I, COLIN MACBETH, a subject of the King of Great Britain, residing at Manor Mills, Salford street, Aston, Birmingham, in the county of Warwick, England, have invented certain new and useful Improvements in or Relating to Wheels for Road-Vehicles, of which the following is a specification.

This invention relates to wheels for road vehicles and has particular reference to wheels having pneumatic or solid rubber tires.

The chief object of the present invention is to prevent the wheel and tire from mounting or becoming damaged by contact with the curb, faulty tram-lines, railway tracks, frozen ruts and other obstacles.

According to this invention, I provide on either or both sides of the wheel, a protector extending laterally from a point adjacent to the juncture of the tire and the wheel rim or felly and inclined inwardly so that the outer or inclined face of the protector on coming into contact with the curb or other obstacle will prevent the tire from contacting therewith and mounting the same, thus preventing damage to the tire.

The protector may be constituted by a continuous annular flange or extension the outer face of which is inclined say at an angle of about 45° to the vertical but in some cases it may be formed of a series of closely arranged extensions or projections, the outer faces of which are inclined and adapted to act in the same manner as the outer inclined face of the continuous flange the exact formation and construction of the protector will however depend upon the particular type of wheel to which it is applied.

In order that the invention may be clearly understood and readily carried into effect the same will now be described more fully with reference to the accompanying drawings, in which—

Figure 1 is a vertical transverse section of a cast metal wheel showing the protector in the form of a flange at the outer side thereof.

Fig. 2 is a side view of a portion of the wheel shown in Fig. 1.

Fig. 3 is an enlarged transverse sectional view of a portion of a cast metal wheel showing in dotted lines a protecting flange on the inner side of the wheel in addition to the protecting flange on the outer side of the wheel.

Fig. 4 is a fragmentary transverse sectional view, illustrating the invention applied to a wire spoked wheel, and Fig. 5 is a similar view showing the invention applied to a wooden or artillery wheel.

Fig. 6 is a side view of a portion of a wheel in which another embodiment of my invention is incorporated.

Fig. 7 is a sectional view taken on line 7—7, Fig. 6.

Fig. 8 is a sectional view taken on line 8—8, Fig. 6.

In the various figures, A indicates the tire on the wheel, B the wheel rim on or in which the tire is mounted, C the spokes and D represents the aforesaid protector in the form of a continuous flange at the outer side of the wheel, which flange as shown extends laterally from a point adjacent to the juncture of the tire and wheel rim and is inclined inwardly *i. e.* toward the axis of rotation of the wheel; in Figs 3 to 5, $x$ and $y$ represent respectively the road surface and the curb in section.

Referring to the example shown in Figs. 1, 2 and 3, showing a cast metal wheel, the protecting flange D is cast in one with the wheel rim or felly B, the spokes C and the hub E, the spokes C being shaped or outwardly curved at their outer ends and edges to join with the inner side of the protecting flange so as to form a support for and thus strengthen the latter. This type of wheel is especially intended to receive a solid tire A as shown.

The example shown in Fig. 4 illustrates any suitable form of wire spoked wheel having the usual channel shaped rim B in which the edges of a pneumatic tire A are secured. In this case the protecting flange D is made separate from the wheel rim and is secured in position around the outer edge of the rim by rivets F; the protecting flange may however be secured to the rim in any desired or appropriate manner.

In the case of a wheel having a wooden felly B′, as shown in Fig. 5 the protecting flange may be provided with means such as a ring G adapted to be bolted, screwed or otherwise attached to the wheel. Existing wheels may thus be fitted with the protecting flange without necessitating any or much alteration to the wheel.

In most instances as shown in the various examples referred to above the protecting flange extends laterally from the rim at an angle of about 45° in an inward direction relatively to the axis of rotation of the wheel and the flange is so positioned that its outer inclined surface will meet or come into contact with the edge of a curb as shown in Figs. 3, 4 and 5; the outer edge or periphery of the flange need not extend far beyond the vertical plane at the outer end of the wheel hub, see Fig. 1, and in some cases it would not extend beyond the said plane so that the flange is not in any way inconvenient or unsightly. In event of the improved wheel coming forcibly into contact with the curb the protector on striking the curb prevents the tire from mounting the curb and consequently protects the tire from being injured or damaged.

In some cases a protecting flange D' may be formed or secured at the inner side of the wheel as shown by dotted lines in Fig. 3 to prevent damage to the wheel or tire by frozen ruts, railway tracks or other obstacles; the inner protecting flange B' may be of any suitable kind and may be formed or fitted in any appropriate manner according to the type of wheel to which it is to be applied.

In Figs. 6, 7 and 8 I have illustrated the protector as being composed of a series of closely arranged extensions or projections D$^x$ which present an inclined protector around the wheeel so as to serve exactly the same purpose as a continuous flange. In this case, instead of having separate spokes, the rim of the wheel is connected to the hub by means of the plates C$^x$. It is, of course, obvious that in the embodiment shown in Figs. 6, 7 and 8 spokes may be employed in which event the extensions D$^x$ would be integral with the spokes and rim of the wheel. From the foregoing description it will be understood that the protector according to this invention prevents the tire from coming into contact with the curb, unless the vehicle is intentionally backed right on to the curb as is sometimes necessary. When the vehicle is running alongside a curb, the protector will prevent the tire from contacting therewith and the steering gear may be turned toward the curb continuously, but the tire cannot come into contact with the curb nor can the wheel mount the curb.

What I claim and desire to secure by Letters Patent of the United States is:—

1. A vehicle wheel which is formed or provided with a protector, the outer or protecting surface of which extends laterally from a point adjacent to the juncture of the tire and wheel rim or felly, said projecting surface being inclined inwardly toward the center of the wheel and beyond the inner circumference of the rim to a relatively large depth whereby said surface will engage the angular portion or corner edge of a curb and form a point contact therewith.

2. A vehicle wheel which is formed or provided with a protector, the outer or protecting surface of which extends laterally from a point adjacent to the juncture of the tire and wheel rim or felly, said surface being inclined inwardly toward the center of the wheel and beyond the inner circumference of the rim at an angle of about 45° to the vertical and having a relatively large depth whereby said surface will engage the angular portion or corner edge of a curb and form a point of contact therewith.

3. A vehicle wheel having spoke members, a wheel rim and a protector cast as an integral element, said spoke members having extensions for reinforcing said protector.

4. A vehicle wheel having spoke members, a wheel rim and a protector, the outer or protecting surface of the latter of which extends laterally from a point adjacent to the juncture of the tire and wheel rim or felly and is inclined inwardly toward the center of the wheel, said spoke members having extensions for reinforcing said protector and said wheel rim, spoke members, protector and extensions on said spoke members being cast as an integral element.

5. A vehicle wheel provided with a protector comprising a series of projections closely arranged about the wheel to practically form a continuous flange, the outer or protecting surfaces of which projections extend laterally from a point adjacent to the juncture of the tire and wheel rim and are inclined inwardly toward the center of the wheel and beyond the inner circumference of the rim a sufficient distance to engage the angular portion or corner edge of the curb and so form a point contact therewith.

6. A vehicle wheel having spoke members, a wheel rim and a protector, the outer or protecting surface of the latter of which extends laterally from a point adjacent to the juncture of the tire and wheel rim or felly and is inclined inwardly toward the center of the wheel, said spoke members having extensions for reinforcing said protector and said wheel rim, spoke members and protector on said spoke members being cast as an integral element.

COLIN MACBETH.